US006127742A

United States Patent [19]

Weynachter

[11] Patent Number: 6,127,742

[45] Date of Patent: Oct. 3, 2000

[54] DRAW-OUT ELECTRICAL SWITCHGEAR APPARATUS

[75] Inventor: Luc Weynachter, Grenoble, France

[73] Assignee: Schneider Electric SA, France

[21] Appl. No.: 09/214,133

[22] PCT Filed: Jul. 10, 1997

[86] PCT No.: PCT/FR97/01267

§ 371 Date: Dec. 29, 1998

§ 102(e) Date: Dec. 29, 1998

[87] PCT Pub. No.: WO98/02951

PCT Pub. Date: Jan. 22, 1998

[30] Foreign Application Priority Data

Jul. 16, 1996 [FR] France .................................. 96/09128

[51] Int. Cl.[7] ........................................................ H02J 3/00

[52] U.S. Cl. ............................... 307/38; 307/40; 361/605

[58] Field of Search ........................ 307/38, 40; 340/638; 361/605, 636, 656; 364/528.27

[56] References Cited

U.S. PATENT DOCUMENTS

| | | | |
|---|---|---|---|
| 4,497,038 | 1/1985 | Diepold-Scharnitzky et al. | 364/900 |
| 5,596,263 | 1/1997 | Zavis et al. | 323/255 |
| 5,596,473 | 1/1997 | Johnson et al. | 361/197 |
| 5,672,943 | 9/1997 | Vivers | 307/40 |
| 5,841,616 | 11/1998 | Crosier | 361/102 |
| 5,877,691 | 3/1999 | Suptitz et al. | 340/638 |

FOREIGN PATENT DOCUMENTS

| | | |
|---|---|---|
| 0 414 657 A2 | 2/1991 | European Pat. Off. . |
| 2 663 151 | 12/1991 | France . |
| 0 466 152 A1 | 1/1992 | France . |
| 0 593 322 A1 | 4/1994 | France . |
| 2 728 712 | 6/1996 | France . |
| 40 13 491 A1 | 11/1991 | Germany . |
| 44 25 876 A1 | 1/1996 | Germany . |
| 2 286 904 | 8/1995 | United Kingdom . |

*Primary Examiner*—Josie Ballato
*Assistant Examiner*—Roberto Rios
*Attorney, Agent, or Firm*—Parkhurst & Wendel, L.P.P.

[57] ABSTRACT

The electrical switchgear apparatus comprises a fixed part (1) and a removable part (2) designed to be connected to the fixed part to be connected to a power distribution system (4) and to a communication network (6). The removable part (2) comprises a communication circuit (23) and a first addressing device (24) connected to a first address input of the communication circuit (23). The fixed part (1) comprises a second addressing device (18) designed to be connected to a second addressing input of the communication circuit (23). To communicate, the communication circuit chooses in priority the address supplied by the second addressing device. If this address is not valid, it then chooses the address supplied by the first addressing device.

16 Claims, 8 Drawing Sheets

6
18
1
ADR2
ADR1
24
19 20
AD2
AD1
2
AD2
COM1
23
5 14
33
35 36
10
11
MEM
PROCESSING UNIT
7
9
4
3 8
12

DRAW-OUT ELECTRICAL SWITCHGEAR APPARATUS

BACKGROUND OF THE INVENTION

The invention relates to an electrical switchgear apparatus comprising:

- a fixed part connected to an electrical power distribution system,
- a removable part comprising at least one electrical switchgear apparatus designed to be connected to the electrical power distribution system via the fixed part,
- first connecting means designed to be easily connected and disconnected to connect the apparatus of the removable part to the fixed part and to the electrical power distribution system, and
- a processing unit associated to the electrical apparatus and located on the removable part.

Known electrical switchgear apparatuses comprise a fixed part connected in permanent manner to an electrical power system and a removable part able to be easily connected to and disconnected from the fixed part. In the case of a circuit breaker, the fixed part is a frame or support comprising fixed connectors connected to the electrical power system. The removable part is a circuit breaker comprising connecting studs designed to be connected to the fixed connectors.

In known manner, the removable parts such as circuit breakers, contactors or switches comprise auxiliary control or indicating circuits. These auxiliary circuits are connected to monitoring or control circuits via plug-in contacts arranged between the fixed part and the removable part.

The circuit breakers comprise electronic processing units equipped with setting devices. Said settings notably concern tripping curves which require the current threshold and time delay value parameters to be set. When these settings are complex, the processing units store the setting parameters in memory.

It is also known to fit communication devices in electrical switchgear apparatuses. These devices are generally used to transmit or receive information concerning the status of the apparatus, the currents flowing in the power system, or control orders.

The communication devices are disposed on the removable part and connected notably to an electronic trip device. When the switchgear apparatus is a circuit breaker, the communication device is connected to a communication network via plug-in contacts arranged between the fixed part and the removable part. Preferably, the communication network comprises a two-wire bus.

When several communication devices are connected to the communication bus, each device comprises an addressing means so as to identify the messages it transmits or receives. The addressing means are for example thumbwheels, blocks of several contacts or electronic memories.

The removable parts of the electrical switchgear apparatus are designed to be easily disconnected and replaced by personnel specialized in maintenance of electrical installations. This personnel must be able to replace the electrical switchgear apparatuses, such as circuit breakers, in a simple and reliable manner without having to perform any work on complex settings of the electronic circuit breakers or the communication devices.

However, switchgear apparatuses comprising complex trip devices or communication devices require work to be carried out each time a replacement is made. This work mainly involves re-establishing all the processing unit settings and notably configuration of the communication address.

SUMMARY OF THE INVENTION

Accordingly, it is a primary object of the present invention to provide an electrical switchgear which includes a fixed part such as a frame and a removable part such as a circuit breaker designed to be connected, through the fixed part, to a power distribution system and to a communication network. The removable part comprises a first communication circuit receiving a first address from a first addressing device. The fixed part comprises a second addressing device and a second communication circuit designed to supply a second address to the first communication circuit. To communicate, the first communication circuit chooses in priority the address supplied by the second addressing device and the second communication circuit. If this address is not valid, it then chooses the address supplied by the first addressing device.

BRIEF DESCRIPTION OF THE DRAWINGS

Other advantages and features will become more clearly apparent from the following description of different embodiments of the invention given as non-restrictive examples only and represented in the accompanying drawings in which.

DETAILED DESCRIPTION OF THE PREFERRED EMBODIMENT

Figure 1:
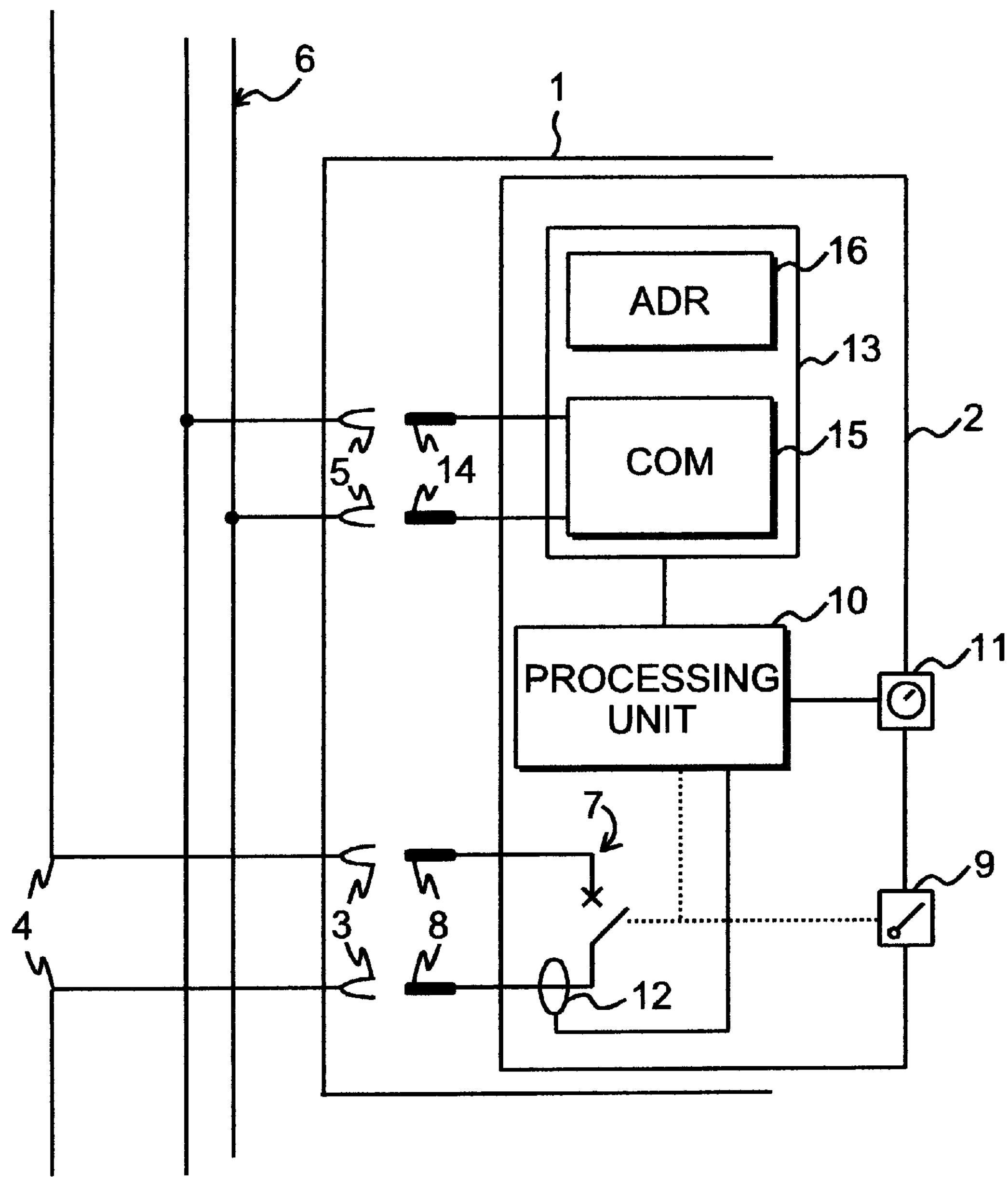
FIG. 1 represents the diagram of a known electrical switchgear apparatus.

The electrical switchgear apparatus of FIG. 1 comprises a fixed part 1 and a removable part 2. The fixed part 1 comprises main connectors 3 connected in fixed manner to an electrical power distribution system 4 and auxiliary connectors 5 connected to a communication network 6. The electrical power distribution system 4 supplies an installation with single-phase or three-phase, direct or alternating current. The communication network 6 is for example a two-wire bus connected to several electrical switchgear apparatuses and to a monitoring and display unit.

The removable part 2 comprises an electrical breaking apparatus 7, for example a circuit breaker, switch or contactor, connected to main contacts 8 of plug-in type. The contacts 8 cooperate with the main connectors 3 in such a way as to be easily connected and disconnected particularly when replacement of the fixed part takes place.

The apparatus 7 can be associated to an operating device 9 and to a processing unit 10. The processing unit comprises a setting device 11 accessible to a user. A current sensor 12 connected in series with the main contacts 8 supplies to the processing unit signals representative of the currents flowing in the apparatus 7.

The processing unit can receive multiple setting parameters. These settings are notably threshold and time delay values supplied for example by the setting devices 11 which can comprises switches, pushbuttons, readouts, or displays.

In the removable part 2 a communication device 13 is connected to the processing unit 10 and to auxiliary contacts 14 of plug-in type. The contacts 14 cooperate with the auxiliary connectors 5 so as to be easily connected and disconnected. The communication device 13 comprises a communication circuit 15 connected to the contacts 14 and to the unit 13 and an addressing device 16 connected to the communication circuit 15. The processing unit supplies information and receives data and operating orders routed via the communication circuit.

The communication circuit uses a communication address ADCOM to sign the messages it transmits and to identify the messages it receives.

The removable parts of the electrical switchgear apparatuses must be able to be replaced quickly and configured in a simple and reliable way.

In known switchgear apparatuses such as that of FIG. 1, replacement of a removable part requires setting of the parameters of the processing unit and addressing device. To guarantee a good reliability of operation of an electrical installation and to reduce the fitting time of the removable part, it is preferable not to have to configure the processing unit and/or communication device each time a replacement is made. In certain cases, the processing unit may have parameters which are not directly accessible by maintenance personnel.

Moreover, the addressing of the communication circuit of the removable part must however be able to be configured. The address depends on the place where the removable part will be fitted in the electrical installation. Generally, in the removable parts the addressing device is not easily accessible. This arrangement of the addressing device complicates replacement of the removable part.

A switchgear apparatus according to the invention comprises in its fixed part parameter setting means to set the parameters of elements of the removable part such as the processing unit or a communication circuit.

Figure 2:
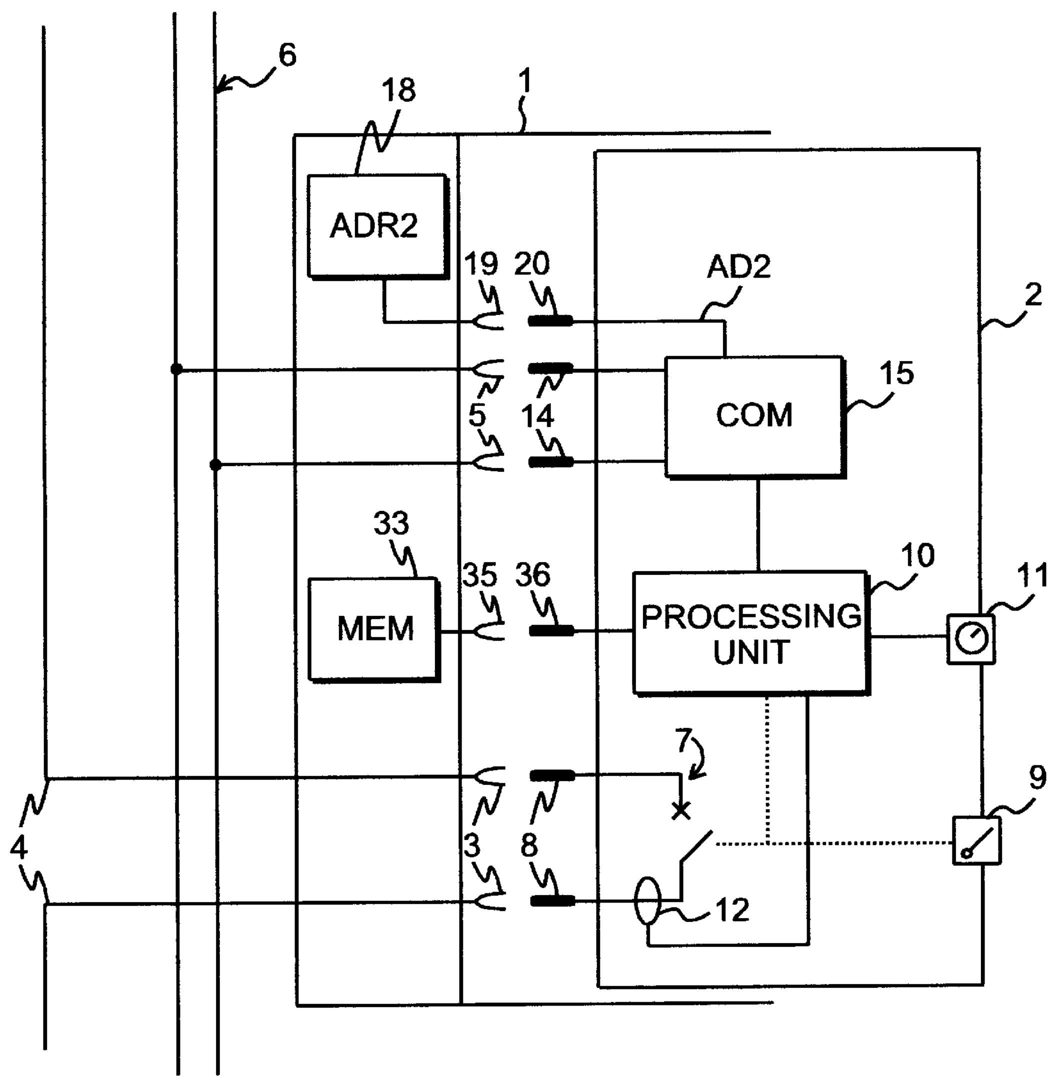
FIG. 2 represents the diagram of an electrical switchgear apparatus according to a first embodiment of the invention.

In a first embodiment of the invention represented in FIG. 2, the fixed part 1 comprises a first storage device 33 designed to be connected to the processing unit 10. The connection between the device 33 and the processing unit is achieved by connectors 35 and contacts 36 able to be easily connected and disconnected.

The device 33 is used to set the parameters of the processing unit 10 when the switchgear apparatus is replaced. When the switchgear apparatus is a circuit breaker, it contains for example parameters representative of type of apparatus, rating, current threshold, time delay values, energy or broken current value.

When a new removable part is fitted, the parameters are transferred from the fixed part to the removable part. Thus, replacing a switchgear apparatus no longer requires a complex setting procedure and continuity of service of the apparatus is efficiently ensured.

In communicating apparatuses, the processing unit comprises or is associated to a communication circuit whose addressing has to be configured.

In this embodiment of the invention, the fixed part 1 comprises an addressing device 18 designed to supply an address AD2 of the communication circuit 15. The addressing device 18 is connected to the communication circuit via a connector 19 and a contact 20 able to be easily connected and disconnected.

Configuration of the addressing device 18 is performed when the electrical installation is first powered up. Subsequently, each time the removable part is replaced, the addressing device no longer needs to be configured.

When the processing unit comprises the communication circuit, the operating parameters can be either processing unit setting parameters or communication circuit addressing parameters. The storage device can in this case also supply the address of the communication circuit. Thus the parameter setting means can involve storage means and/or addressing means.

Figure 3:
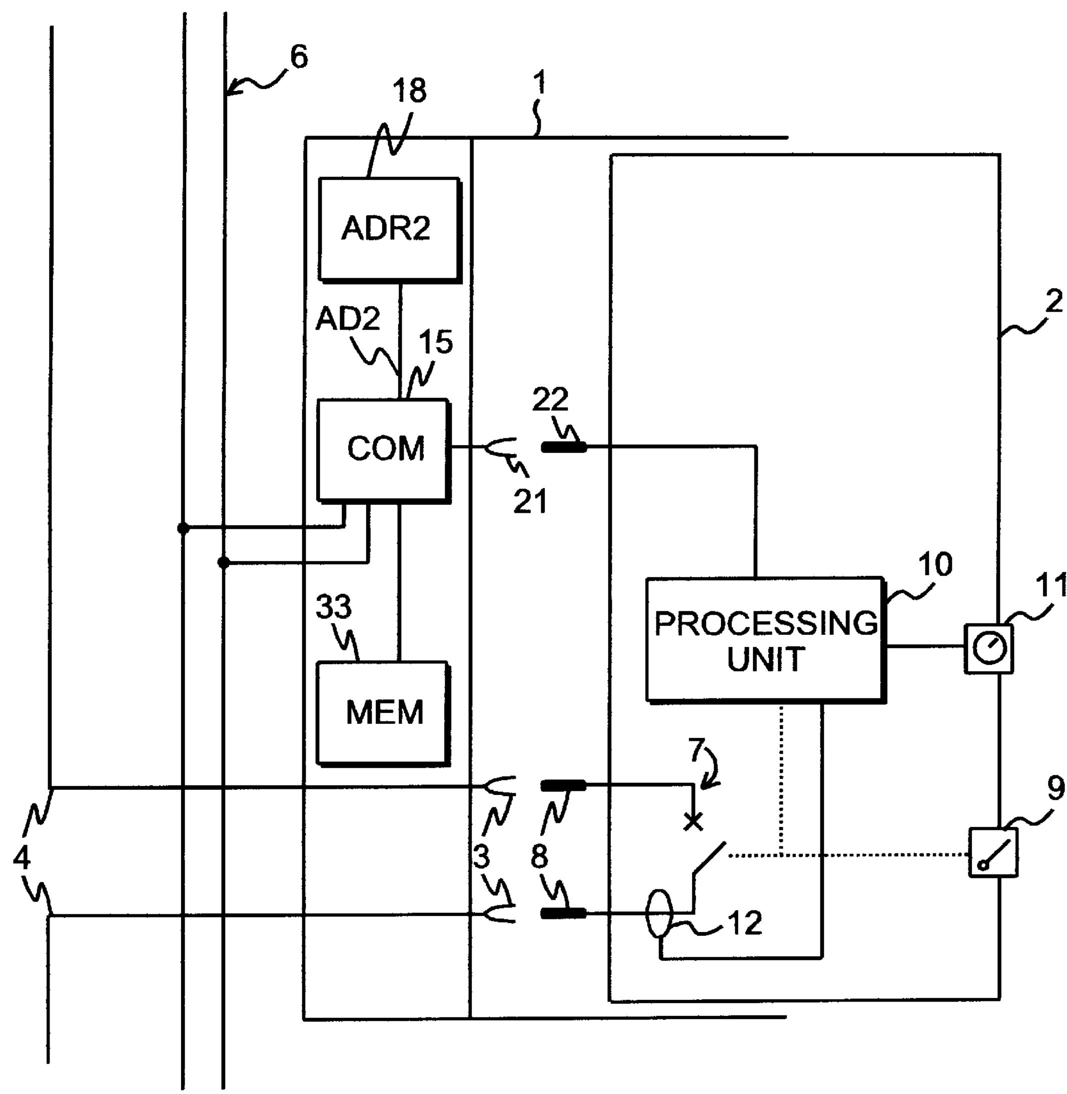
FIG. 3 represents the diagram of an electrical switchgear apparatus according to a second embodiment of the invention.

In a switchgear apparatus according to a second embodiment of the invention, represented in FIG. 3, the fixed part 1 comprises a communication circuit 16 and an addressing device 18.

In this embodiment, the storage device 33 comprising parameters to be supplied to the processing unit is connected to the communication circuit arranged in the fixed part. Thus, the parameters are routed via the circuit 15 and the connectors 21 and contacts 22.

The communication circuit 15 is directly connected to the communication network 6. The addressing device 18 supplies an address AD2 to the communication circuit 15. The processing unit 10 of the removable part is connected to the communication circuit 15 by connectors 21 and contacts 22 able to be easily connected and disconnected.

In this embodiment of the invention, the removable part can be easily replaced without any work being necessary on the addressing device 18 each time a replacement is made. The processing unit of each removable part will be connected to the communication circuit 15 of the fixed part which does not change and will receive the parameters from the device 33.

When the removable part is in particular a complete circuit breaker comprising an electronic trip device having a processing unit and a communication circuit, this part can also be achieved in the form of a fixed apparatus.

It is preferable, in order to rationalize manufacturing of the electrical switchgear apparatuses, that identical apparatuses be able to be used in a permanent or removable manner in association with a fixed part.

The removable parts 2 represented in FIGS. 2 or 3 do not enable this twofold functionality to be achieved directly. The part 2 of the first embodiment does not comprise an addressing device, and the part 2 of the second embodiment does not comprise an integrated communication circuit. This part 2 of the second embodiment requires an additional communication device to be added in the case of permanent use without a fixed part.

Figure 4:
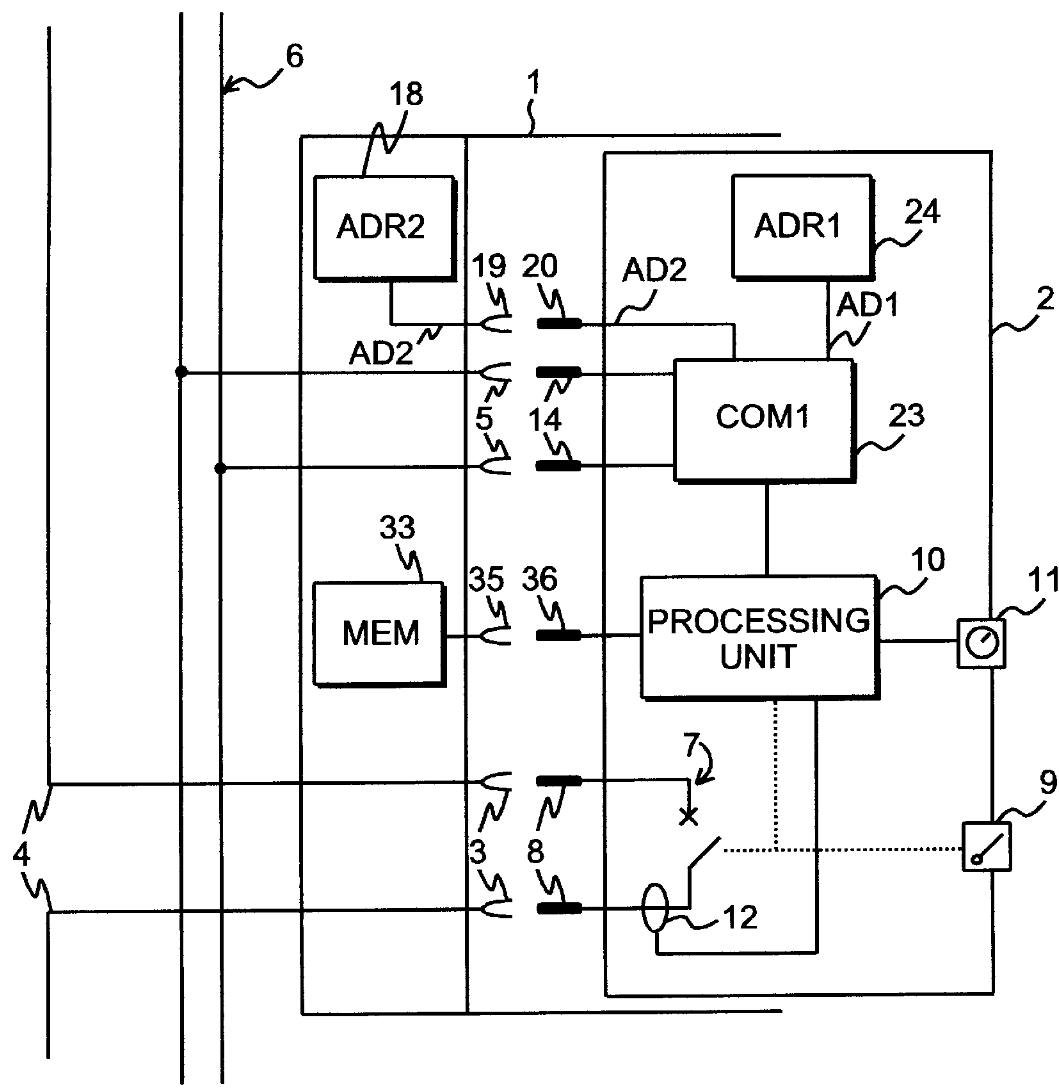
FIG. 4 is a circuit diagram of an electrical switchgear apparatus in a disconnected position according to a third embodiment of the invention.
Figure 5:
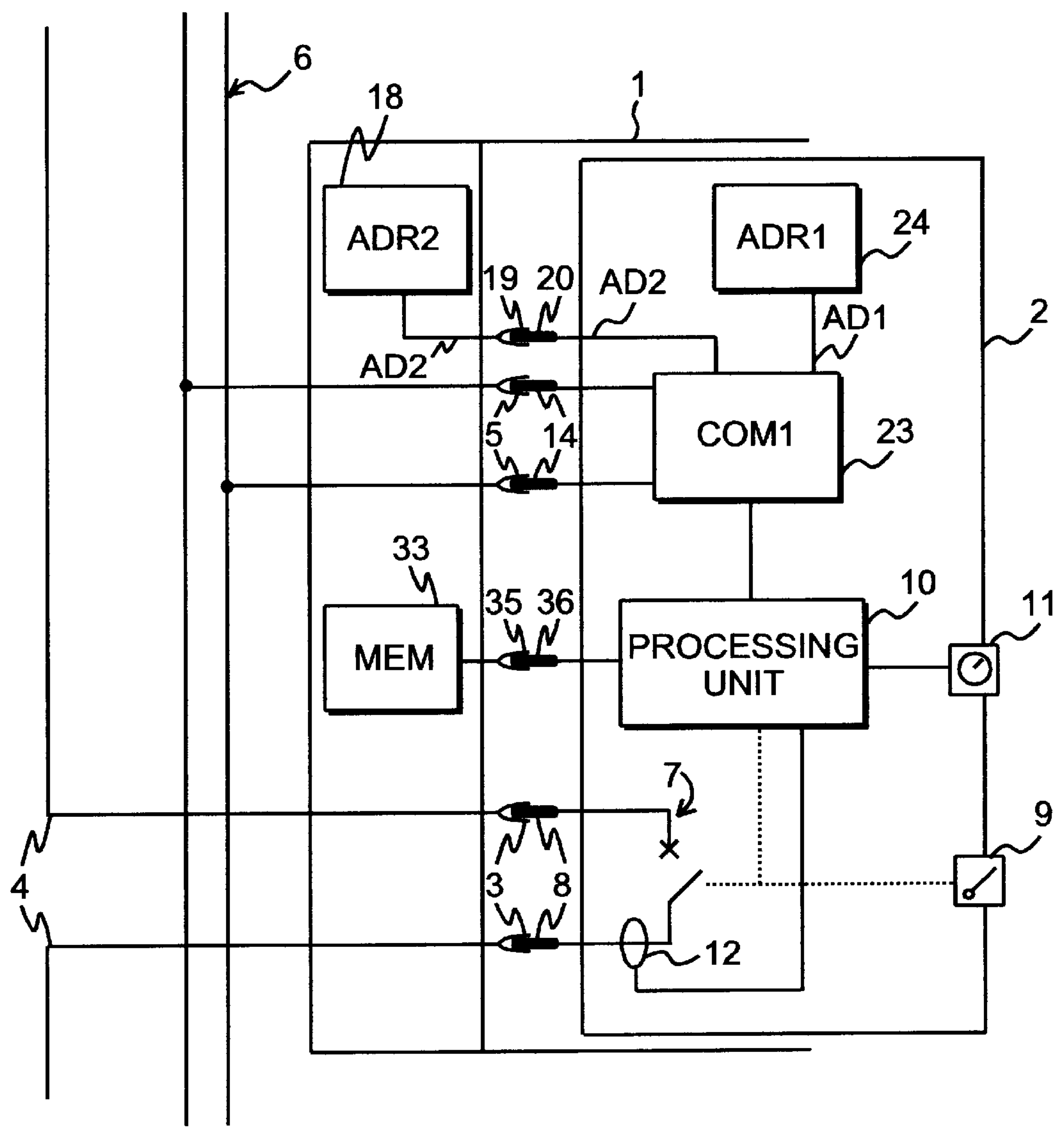
FIG. 5 is a circuit diagram of an electrical switchgear apparatus in a connected position according to a third embodiment of the invention.

In an electrical switchgear apparatus according to a third embodiment of the invention, represented in FIGS. 4 and 5, the removable part 2 can also be used in permanent manner in an electrical installation.

The removable part 2 comprises a first communication circuit 23 and a first addressing device 24. The first communication circuit 23 has a first and a second address input. The first addressing device 24 connected to the first address input of the communication circuit 23 supplies a first address AD1 to it. The fixed part 1 comprises a second addressing device 18. The second addressing device 18 connected on the second address input of the first communication circuit 23 supplies a second address AD2 to it.

The removable part 2, according to this embodiment, can also be used in permanent manner. When the removable part 2 is associated to a fixed part 1, the communication circuit receives an address signal AD2 supplied by the second addressing device. This address AD2 is used in priority by the circuit 23.

In the case where the part 2 is not used as a removable part but is installed in permanent manner, the address signal AD2 does not exist. The circuit 23 detects the absence of the address AD2 and then chooses the address AD1 supplied by the first addressing device 24.

Figure 6:
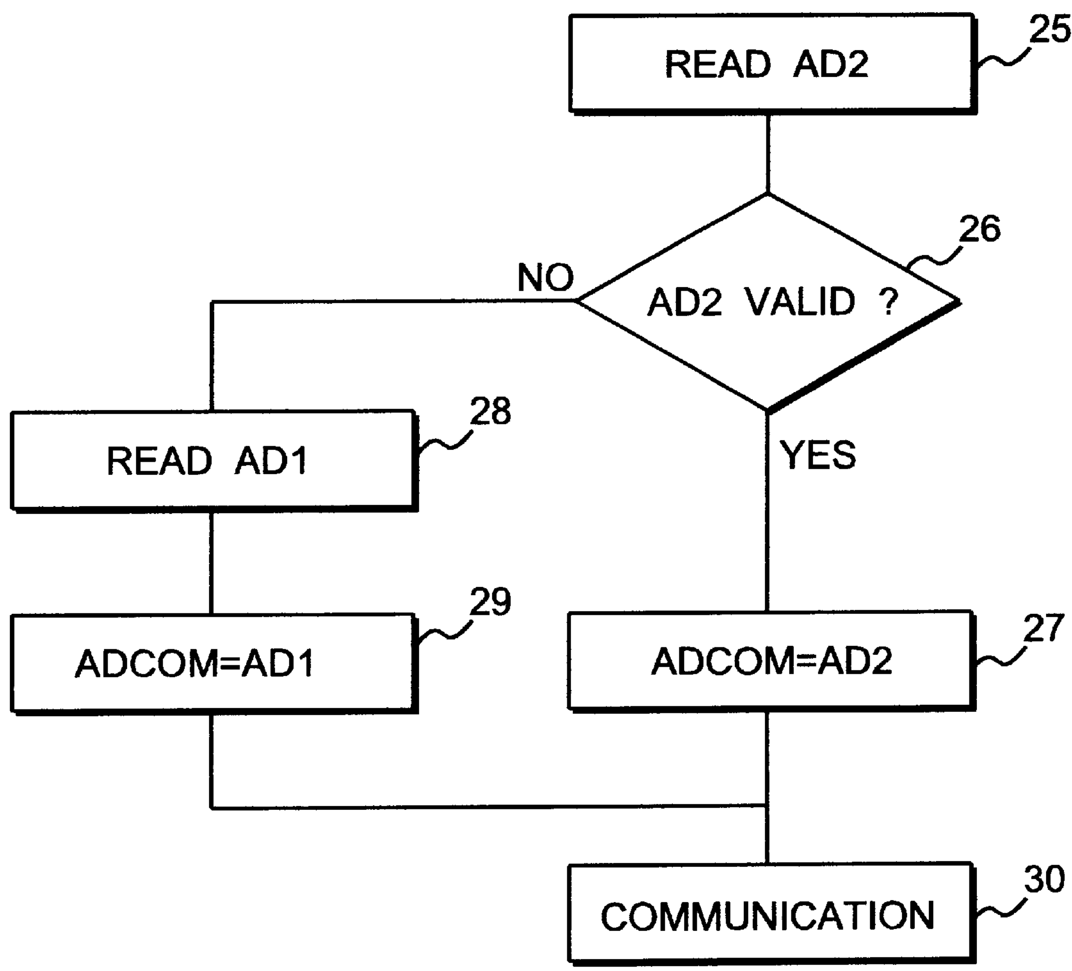
FIG. 6 shows an initialization flowchart of a communication circuit able to be used in the embodiment of FIGS. 4 and 5.

A flowchart of the processing performed when choosing the communication address ADCOM is represented in FIG. 6.

In a first step 25, the communication circuit 23 reads the address AD2 on its second address input. Then (step 26) the circuit 23 checks the validity of the address AD2. If the address AD2 is valid, the communication address ADCOM is loaded with a value representative of the address AD2 (step 27).

If the address AD2 is absent or is not valid, the circuit 23 reads the address AD1, in a step 28, on its first address input. Then (step 29) the communication address ADCOM is loaded with a value representative of the address AD1.

After the value of the address ADCOM has been initialized, the circuit 23 uses this address in communication phases 30.

Initialization of the address ADCOM is performed during general initialization of the circuit 23. It can also be subsequently initialized in cyclic manner.

Likewise, transfer of the setting parameters from the fixed part to the processing unit of the removable part will only be effective in the presence of storage devices and of valid parameters in this device. In the other cases, a default setting or manual setting by the setting device 11 will be used to set the processing unit parameters.

Figure 7:
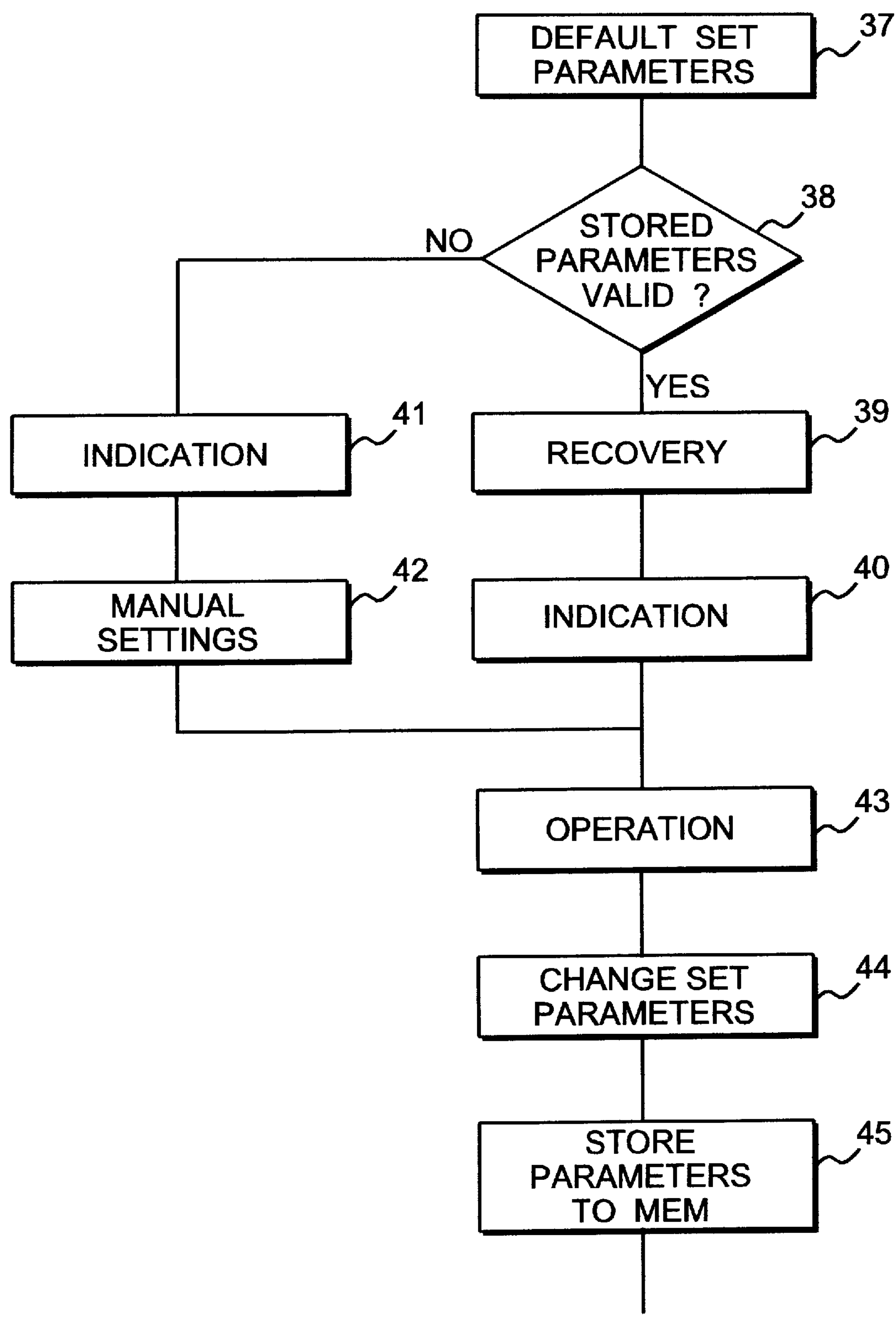
FIG. 7 shows a flowchart of initialization of a processing unit able to be used in switchgear apparatuses according to the embodiments of the invention.

A flowchart representing parameter changing is represented in FIG. 7.

When the removable part is fitted, in a step 37, the processing unit has default setting values. Then a test of the presence or validity of parameters supplied by a storage device of the removable part is carried out in a step 38. If the parameters are correct, recovery of these parameters is performed in a step 39. Then, in a step 40, indication of parameter recovery is made.

If the parameters are absent or are not valid, the processing unit indicates this in a step 41 and manual setting is necessary in a step 42.

In a step 43 the processing unit operates with, depending on the case, default setting parameters, manually set parameters or parameters recovered from a storage device of the removable part.

In a step 44, the setting parameters or other status and operating parameters can change automatically or be changed by a user. These new parameters are then stored in a step 45 in the storage device of the fixed part for subsequent use, notably when replacement of the removable part takes place.

Figure 8:
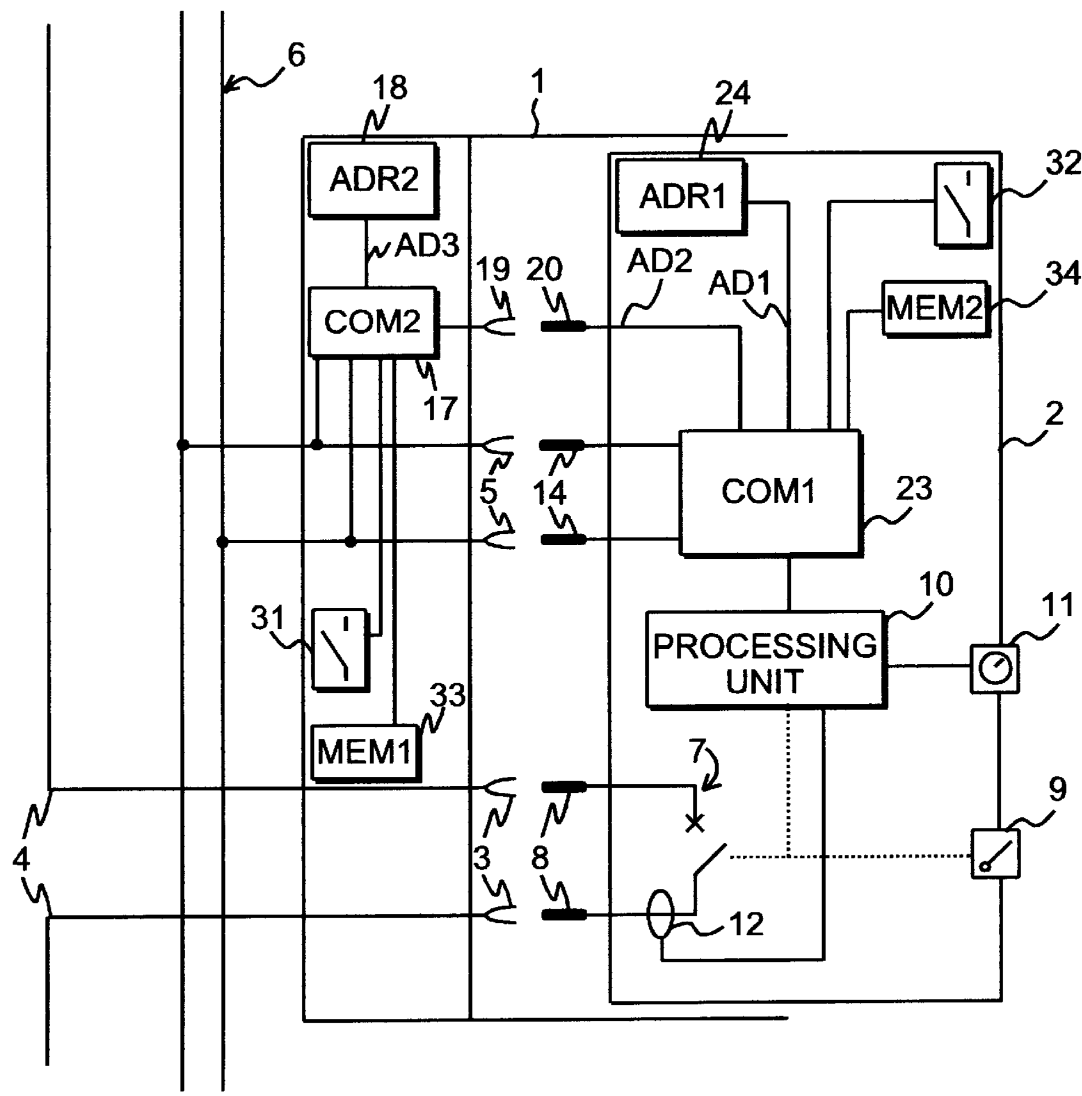
FIG. 8 shows a diagram of an electrical switchgear apparatus according to a preferred embodiment of the invention.

FIG. 8 shows a fourth embodiment of the invention which is a development of the third embodiment. The fixed part 1 comprises a second communication circuit 17 and the second addressing device 18. The removable part comprises the first communication circuit 23 comprising its two address inputs AD1 and 1D2. The first addressing device 24 supplies the first address AD1.

In the fixed part 1, the communication circuit 17 is connected directly to the communication network 6. The second addressing device 18 supplies a third address AD3 to the second communication circuit 17. In this embodiment, the circuit 17 comprises an address output supplying to the first communication circuit 23 the value of the second address AD2. The connection between the address output of the circuit 17 and the input of the second address of the circuit 23 is made via the connectors 19 and contacts 20.

The value of the address AD2 is defined with respect to the value of the address AD3 supplied by the addressing device 18. The address AD2 is preferably identical to the address AD3 supplied by the device 18. The two communication circuits 17 and 23 will thus communicate on the network 6 with the same address. The circuit 23 uses either the address AD1 in permanent use or the address AD2 in removable use like the circuit 23 of FIGS. 4 and 5.

This embodiment is particularly useful when the fixed part has to communicate information to the communication network 6. The fixed part of FIG. 8 comprises first status sensors 31 connected to an input of the second communication circuit 17. These sensors 31 supply information on the status of the fixed part, notably information concerning the presence or absence of a removable part, or on locking preventing a removable part from being fitted.

The removable part 2 comprises second status sensors 32 connected to the first communication circuit 23. The second sensors 32 supply to the circuit 23 information concerning the status of the removable part. If the removable part is a draw-out circuit breaker, the sensors 32 indicate to the circuit 23 notably the open or closed status of the main contacts and/or the causes for opening of the apparatus. These causes for opening are for example manual opening, opening by the trip device on a fault or opening by a remote control or by auxiliary circuits.

According to a development of the third and fourth embodiments of the invention, the first storage circuit 33 is connected to the second communication circuit 17. The storage circuit 33 enables initialization data and operating parameters designed to be used by the first communication circuit 23 to be stored.

The initialization data comprise for example the processing unit setting parameters, the identification of the type of apparatus of the removable part, its rating and/or the last value of the current which was flowing in the apparatus. For a circuit breaker the setting parameters serve the purpose of defining the thresholds and time delays of tripping curves.

When initialization of the communication circuit 23 is performed, the circuit 17 supplies an address value AD2 to the circuit 23, reads the data in the storage circuit 33 and transfers these data to the circuit 23 so that it can complete initialization of the data and of the operating parameters.

The removable part 2 comprises a second storage circuit 34 connected to the first communication circuit 23. This circuit 34 enables data supplied by the first storage circuit 33 to be stored.

The initialization data can be generated or modified by the processing unit. For example, on a first initialization of the first circuit 23 of a first removable part 1, the processing unit sends initialization data to the circuit 23. Then the circuit 23 stores these data in the circuit 34 and/or sends them to the circuit 17 of the fixed part 1. The circuit 17 stores the data in the associated storage circuit 33.

When a replacement or a new connection of a removable part 2 is made, the communication circuit 17 sends the address AD2 and the data stored in the circuit 33 to the new communication circuit 23. The circuit 23 initializes these operating parameters, stores the data in the associated circuit 34 and communicates with the network 6 and processing unit 10.

The data can be sent to the processing unit and new data supplied by the processing unit can be modified or be added to those already stored.

Initialization data can be supplied by an initialization device other than the processing unit or be received via the communication network 6.

The removable part is preferably a circuit breaker or a switch of draw-out type able to be installed in a fixed part such as a support or a frame. However the invention can be applied to other electrical switchgear apparatuses.

In the embodiments of the invention described above, the connections between the communication circuit of the removable part and the elements of the fixed part are achieved by means of connectors 5, 19, 21 and electrical contacts 14, 20, 22. But it is possible to achieve apparatuses according to the invention comprising electrically insulated connections between the communication circuits of the removable part and elements of the fixed part. These connections can for example be achieved by optic coupling or by electromagnetic radiation.

What is claimed is:

1. A draw-out electrical switchgear apparatus comprising:

a fixed part constituting a support and connected to an electrical power distribution system;

a removable part designed to be supported by the fixed part and comprising at least one electrical switchgear apparatus designed to be connected to the electrical power distribution system via the fixed part, and a processing unit associated to said electrical apparatus and receiving signals representative of electrical currents;

first connecting means designed to be easily connected and disconnected to connect the apparatus of the removable part to the fixed part and to the electrical power distribution system;

parameter setting means located in the fixed part to set at least one parameter of the processing unit of the removable part;

connecting means to connect said parameter setting means of the fixed part to said processing unit of the removable part, a first communication circuit situated in the removable part and connected to the processing unit and to the communication network via connecting means which are easily connectable and disconnectable, the first communication circuit comprising a first and second address input, said parameter setting means comprising first addressing means situated in the removable part and connected to the first communication circuit, said first addressing means supplying a first address to the first communication circuit, a second communication circuit situated in the fixed part connected to the communication network and comprising an address output connected to the second address input of the first communication circuit, the second communication circuit supplying a second address to the first communication circuit, and said parameter setting means further comprising second addressing means situated in the fixed part and connected to the second communication circuit of the fixed part, said second addressing means supplying a third address to the second communication circuit.

2. The electrical switchgear apparatus according to claim 1 wherein said parameter setting means comprise first means for storing in memory.

3. The electrical switchgear apparatus according to claim 1 wherein said parameter setting means supply parameters representative of current thresholds and time delay values.

4. The electrical switchgear apparatus according to claim 2 wherein the processing unit supplies the first storage means with parameters to be stored in memory before disconnection of the first connecting means.

5. The electrical switchgear apparatus according to claim 1 wherein the processing unit comprises means for processing electrical protection functions.

6. The electrical switchgear apparatus according to claim 1 wherein the second address supplied by the second communication circuit to the first communication circuit is identical to the third address supplied to the second communication circuit by the second addressing means.

7. The electrical switchgear apparatus according to claim 1 wherein the first communication circuit comprises a communication address and means for initializing said communication address, the means for initializing the communication address in priority to a value equal to the value of the second address received on the second addressing input or, if the second address is not valid, to the value of the first address received on the first input.

8. The electrical switchgear apparatus according to claim 1 comprising first status contacts situated in the fixed part and connected to the second communication circuit.

9. The electrical switchgear apparatus according to claim 1 wherein the first storage means are situated in the fixed part and connected to the second communication circuit.

10. The electrical switchgear apparatus according to claim 9 wherein the first storage means receive initial operating parameters from the communication network.

11. The electrical switchgear apparatus according to claim 2 wherein the first storage means store operating parameters in memory at each setting of the processing unit by processing unit setting means.

12. The electrical switchgear apparatus according to claim 1 comprising second status contacts situated in the removable part and connected to the first communication circuit.

13. The electrical switchgear apparatus according to claim 1 comprising second storage means situated in the removable part and connected to the first communication circuit.

14. The electrical switchgear apparatus according to claim 1 wherein the removable part is a circuit breaker of draw-out type.

15. In an electrical switchgear apparatus including a fixed part constituting a support and connected to an electrical power distribution system, a removable part designed to be supported by the fixed part and comprising at least one electrical switchgear apparatus designed to be connected to the electrical power distribution system via the fixed part, and a processing unit associated to said electrical apparatus and receiving signals representative of electrical currents, first connecting means which are easily connectable and disconnectable to connect the apparatus of the removable part to the fixed part and to the electrical power distribution system, parameter setting means located in the fixed part to set at least one parameter of the processing unit of the removable part connecting means to connect said parameter setting means of the fixed part to said processing unit of the removable part, said parameter setting means supplying operating parameters to the processing unit, a first communication circuit situated in the removable part and connected to the processing unit and to the communication network via connecting means which are easily connectable and disconnectable, the first communication circuit comprising a first and a second address input, first addressing means situated in the removable part and connected to the first address input of the first communication circuit, said first addressing means supplying a first address to the first communication circuit, a second communication circuit situated in the fixed part connected to the communication network and comprising an address output connected to the second address input of the first communication circuit, the second communication circuit supplying a second address to the first communication circuit, and second addressing means situated in the fixed part and connected to the second communication circuit of the fixed part, said second addressing means supplying a third address to the second communication circuit, an initialization procedure wherein said first communication circuit reads the value of the second address in a first step, checks the validity of the second address in a second step, in a third step loads a communication address with the value of the second address if said second address is valid, reads the value of the first address if the second address is not valid in a fourth step, and in a fifth step loads the communication address with the value of the first address.

16. In an electrical switchgear apparatus including a fixed part constituting a support and connected to an electrical power distribution system, a removable part designed to be supported by the fixed part and comprising at least one electrical switchgear apparatus designed to be connected to the electrical power distribution system via the fixed part, and a processing unit associated to said electrical apparatus and receiving signals representative of electrical currents, first connecting means which are easily connectable and disconnectable to connect the apparatus of the removable part to the fixed part and to the electrical power distribution system, parameter setting means located in the fixed part to set at least one parameter of the processing unit of the removable part, connecting means to connect said parameter setting means of the fixed part to said processing unit of the removable part, said parameter setting means supplying operating parameters to the processing unit, a first communication circuit situated in the removable part and connected to the processing unit and to the communication network via connecting means designed to be easily connected and disconnected, the first communication circuit comprising a first and a second address input, first addressing means situated in the removable part and connected to the first address input of the first communication circuit, said first addressing means supplying a first address to the first communication circuit, a second communication circuit situated in the fixed part connected to the communication network and comprising an address output connected to the second address input of the first communication circuit, the second communication circuit supplying a second address to the first communication circuit, and second addressing means situated in the fixed part and connected to the second communication circuit of the fixed part, said second addressing means supplying a third address to the second communication circuit, and said processing unit comprising means for checking the parameters of the parameter setting means, receiving the operating parameters if said parameters are valid, operating using operating parameters, and storing the parameters in the parameter setting means.

* * * * *